United States Patent
Panza et al.

(10) Patent No.: US 9,446,962 B2
(45) Date of Patent: Sep. 20, 2016

(54) PROCESS FOR REVAMPING AN AMMONIA PLANT WITH NITROGEN-BASED WASHING OF A PURGE STREAM

(75) Inventors: Sergio Panza, Como (IT); Pietro Moreo, Lugano (CH); Elio Strepparola, Bedero Valcuvia (IT)

(73) Assignee: Casale SA (CH)

( * ) Notice: Subject to any disclaimer, the term of this patent is extended or adjusted under 35 U.S.C. 154(b) by 0 days.

(21) Appl. No.: 13/379,266

(22) PCT Filed: Aug. 3, 2010

(86) PCT No.: PCT/EP2010/061249
§ 371 (c)(1),
(2), (4) Date: Dec. 19, 2011

(87) PCT Pub. No.: WO2011/018388
PCT Pub. Date: Feb. 17, 2011

(65) Prior Publication Data
US 2012/0141350 A1    Jun. 7, 2012

(30) Foreign Application Priority Data

Aug. 13, 2009 (EP) .................................. 09167849

(51) Int. Cl.
*C01C 1/04* (2006.01)
*C01B 3/02* (2006.01)
(Continued)

(52) U.S. Cl.
CPC ............ *C01C 1/0476* (2013.01); *C01B 3/025* (2013.01); *C01B 3/36* (2013.01); *C01B 13/0229* (2013.01);
(Continued)

(58) Field of Classification Search
CPC ............ C01B 3/025; C01B 2203/046; C01B 2203/068; C01B 2203/142; C01B 2203/146; C01B 2203/148; C01B 2203/0283; C01B 2210/0043; C01B 2210/0046; C01C 1/04; C01C 1/0458; C01C 1/0464; C01C 1/047; C01C 1/0476; C01C 1/0405; C01C 1/0488
USPC .................................................. 423/359–363
See application file for complete search history.

(56) References Cited

U.S. PATENT DOCUMENTS 2,865,864 A    12/1958  Du Bois Eastman et al.
4,479,925 A *  10/1984  Shires et al. .................. 423/359
(Continued)

FOREIGN PATENT DOCUMENTS

EP    0 282 165 A1    9/1988
EP    2284125 A1      2/2011
FR    1274934 A       11/1961

OTHER PUBLICATIONS

Appl, Max, "Ammonia Principles and Industrial Practice" 1999, Wiley, pp. 137, 138, 165-167.*
(Continued)

*Primary Examiner* — Wayne Langel
(74) *Attorney, Agent, or Firm* — Akerman LLP

(57) ABSTRACT

A process and a plant for producing ammonia, where an ASU (3) delivers an oxygen stream and a nitrogen stream; the oxygen stream (9) is fed to the secondary reformer of a front-end reforming section (1); the nitrogen stream (10) is used to wash a purge gas or tail gas taken from the synthesis loop (2), preferably in a cryogenic section; a methane-free and inert-free gas stream is recovered and recycled to the synthesis loop (2) or at the suction of the main syngas compressor, to recover the hydrogen contained therein. A corresponding method for increasing the capacity of an ammonia plant, by providing the ASU and feeding the oxygen stream to the secondary reformer and the nitrogen stream to a suitable purge gas recovery unit.

5 Claims, 4 Drawing Sheets

(51) Int. Cl.
    C01B 3/36      (2006.01)
    C01B 13/02     (2006.01)
    F25J 3/02      (2006.01)
    F25J 3/04      (2006.01)

(52) U.S. Cl.
    CPC ............... *C01C 1/04* (2013.01); *C01C 1/0405* (2013.01); *C01C 1/0482* (2013.01); *F25J 3/0219* (2013.01); *F25J 3/0276* (2013.01); *F25J 3/04539* (2013.01); *F25J 3/04587* (2013.01); *C01B 2203/025* (2013.01); *C01B 2203/068* (2013.01); *C01B 2210/0046* (2013.01); *F25J 2200/74* (2013.01); *F25J 2205/30* (2013.01); *F25J 2210/04* (2013.01); *F25J 2210/20* (2013.01); *F25J 2210/42* (2013.01); *F25J 2270/02* (2013.01); *F25J 2290/80* (2013.01); *Y10T 29/49718* (2015.01)

(56)            References Cited

U.S. PATENT DOCUMENTS

| 4,524,056 | A  | 6/1985  | Banquy          |
| 4,548,618 | A  | 10/1985 | Linde et al.    |
| 5,180,570 | A  | 1/1993  | Lee et al.      |
| 5,736,116 | A  | 4/1998  | LeBlanc et al.  |
| 2004/0234426 | A1 | 11/2004 | Reddy et al. |
| 2006/0198781 | A1 | 9/2006  | Filippi et al. |

OTHER PUBLICATIONS

Appl, Max, "The Haber-Bosch Heritage: The Ammonia Production Technology," Sep. 25-Sep. 26, 1997, 50th anniversary of the IFA Technical Conference, pp. 2-25.*

Arregger, "Production and Purification of Argon," 1964, Chemical and Process Engineering pp. 549-554.*

Isalski, "Separation of Gases," 1989 Oxford University Press, pp. 84-89.*

Duckett et al, "Cryogenic Gas Separation," 1985, The Chemical Engineer, pp. 14-17.*

T. Asami et al, "Energy Consumption in the recovery of argon from purge gas in ammonia synthesis plant," 1996 Cryogenics36 pp. 997-1003.*

International Preliminary Report on Patentability issued in connection with PCT/EP2010/061249.

Response to Written Opinion filed in connection with PCT/EP2010/061249.

Aika, K. et al., Ammonia Catalysis and Manufacture, Ammonia Production Processes (1995) Chapter 6, pp. 202-304, Springer-Verlag, Berlin, Germany.

Isalski, W.H., Rare Gas Recovery, Separation of Gases (1989) Chapter 4, pp. 81-183.

Springmann, Helmut, Methods for Argon Recovery to Meet Increased Demand on the Argon Market, Cryogenic Processes and Equipment, AIChE Symposium Series (1982) No. 224, vol. 79, pp. 12-17, Lotepro Corporation, New York, NY.

* cited by examiner

PROCESS FOR REVAMPING AN AMMONIA PLANT WITH NITROGEN-BASED WASHING OF A PURGE STREAM

This application is a national phase of PCT/EP2010/061249, filed Aug. 3, 2010, and claims priority to EP 09167849.0, filed Aug. 13, 2009, the entire contents of both of which are hereby incorporated by reference.

FIELD OF THE INVENTION

The invention relates to improvements in a process and plant for producing ammonia by steam reforming of a hydrocarbon such as natural gas.

PRIOR ART

Ammonia is produced by catalytic reaction between hydrogen and nitrogen, in a high-pressure synthesis loop. It is known art to feed said high-pressure loop with a make-up synthesis gas mainly consisting of hydrogen ($H_2$) and nitrogen ($N_2$) in a suitable molar ratio, obtained by steam reforming of a hydrocarbon feedstock, usually natural gas (methane) or naphta.

The syngas is obtained in a front-end section of the ammonia plant, comprising essentially a primary reformer, a secondary reformer, a cooling/shift converter, a $CO_2$ separation section, a methanation section and a syngas compressor.

The primary reformer converts steam and a feedstock of a desulphurized hydrocarbon, for example natural gas or substitute natural gas (SNG), into a mixture of carbon monoxide, carbon dioxide and hydrogen, by passage over a suitable catalyst at a pressure usually in the range of 15 to 35 bar, and high temperatures around 800° C. The reaction is carried out in a multiplicity of catalytic tubes, which are heated externally by combustion of a fuel.

Said mixture is passed to the secondary reformer, which operates with air in excess to obtain the desired $H_2/N_2$ molar ratio (HN ratio) and, hence, receives a further air stream from an appropriate air compressor.

The reformed gas exiting the secondary reformer is further treated in a number of down-stream equipments to remove carbon oxides and to obtain a gas composition suitable for ammonia synthesis i.e. having a HN ratio close to 3. A common setup includes: CO-shift converter(s), where most of the carbon monoxide contained in the reformed gas is catalytically converted with unreacted steam into carbon dioxide and hydrogen; a $CO_2$ washing column, where the carbon dioxide content is almost completely removed by scrubbing the gas with an appropriate solvent, such as an aqueous solution of an amine or of potassium carbonate; a methanator where the residual carbon oxides are catalytically converted to methane to avoid poisoning of the down-stream ammonia synthesis catalyst.

The pressure of the syngas is then raised by the main syngas compressor up to the working pressure of the ammonia synthesis loop, generally in the range of 80 to 300 bar, and usually around 150 bar.

U.S. Pat. No. 5,736,116 discloses a retrofitting method by installation of an air separation unit furnishing an oxygen-rich and a nitrogen-rich stream. The oxygen-rich stream is used to enrich the air feed of the secondary reformer, and increase the hydrogen content of the make-up gas substantially above the design stoichiometry and capacity; the nitrogen-rich stream is supplied to the synthesis loop to obtain a desired hydrogen to nitrogen ratio in the syngas feed to the ammonia converters and compensate for the excess hydrogen in the make-up gas.

Retrofitting or boosting an ammonia plant poses a number of problems in connection with the increased flow rate. The capacity of the primary reformer is closely related to the size and number of tubes of the reformer itself; the option of installing additional tubes is generally not possible or very limited; installing an additional pre-reformer is possible, but is expensive and gives an advantage of 10-15% only. It is also necessary to provide more oxygen to the secondary reformer and the capacity of the existing air compressor must be increased. The options of installing new internals on the existing air compressor, or providing a further compressor in parallel to the existing one, are both expensive. Installation of a booster, i.e. a pre-compressor disposed to raise the pressure at the intake of the main air compressor, is less expensive but also less effective. An increased flow rate needs also to be accommodated through the various equipments of the front-end, e.g. $CO_2$ removal unit, methanator, etc. . . . and this may require significant investment costs if any of these equipments needs to be modified.

The capacity of the syngas compressor is also a critical point and a potential bottleneck. Installation of any booster or additional compressor is generally not accepted, because failure of any additional equipment may compromise the reliability of the whole plant and may cause severe damage to the main compressor. It is usually preferred to replace the internals of the compressor and turbine, but this intervention is expensive.

Another problem is the possible accumulation of inert gases in the synthesis loop. The synthesis loops is often operating in presence of gaseous compounds or substances that are inert, at least for the synthesis reaction of ammonia. Examples are methane and argon. Accumulation of inert gases means an increased flow rate and reduced yield of conversion. When the capacity is increased, this problem is correspondingly more relevant. The inert gases have a low solubility in the ammonia which is drawn from the synthesis loop, and the only way to avoid their accumulation is to purge a portion of the synthesis gas. In the prior art, said purge gas is typically treated in special packages such as membranes or a cryogenic package, to recover the hydrogen therein contained, or said purge gas is used as fuel.

All the above problems are felt when an existing plant is revamped, but also when a new plant is designed, trying to increase the overall capability with regard to the size of the main items, such as reformers and compressors.

The prior art gives only a partial solution to the above problems. The invention is aimed at the provision of a better and/or more convenient integration of an air separation unit with a process/plant for producing ammonia.

SUMMARY OF THE INVENTION

A first aspect of the invention is a process for producing ammonia, where: a make-up syngas is produced by steam reforming of a hydrocarbon source, the steam reforming comprising steps of primary reforming and secondary reforming, and further treatment steps of shift, $CO_2$ removal and methanation; the make-up syngas is compressed and reacted in a high-pressure synthesis loop to produce ammonia; an air feed is subject to an air separation process into an oxygen stream and at least one nitrogen stream, the oxygen stream being directed to said secondary reforming to provide additional oxidizer; a nitrogen stream obtained from said air separation process is used for treating a purge gas stream containing inerts, thus obtaining a hydrogen-containing and substantially inert-free recycle gas stream, and said recycle gas stream is recycled to the synthesis loop.

Said purge stream, in preferred embodiments, is a purge gas purged from said synthesis loop or a tail gas coming from a purge gas recovery section.

The purge gas stream containing inerts, according to the invention, is contacted with said nitrogen stream obtained from air separation process.

The terms oxygen stream and nitrogen stream, in this specification, are used with reference to the streams with a desired degrees of purity. The oxygen and nitrogen streams are an oxygen-rich and a nitrogen-rich stream, respectively. Preferably the oxygen stream has a purity of at least 95%, but a less pure oxygen stream can be used in any case; the nitrogen stream has preferably a purity of 99% or more, to avoid $O_2$-poisoning of the catalyst used in the ammonia synthesis loop. The process of air separation is carried out in at least one air separation unit, according to per se known technique.

The nitrogen stream can be in a liquid or gaseous state, or a mixture of liquid and gaseous nitrogen. Separate liquid and gaseous nitrogen streams can also be obtained from the separation of air. According to the invention, different embodiments are possible for use of the liquid or gaseous nitrogen stream(s).

According to still further embodiments of the invention, the process of air separation can deliver a first nitrogen stream used to adjust the hydrogen to nitrogen ratio of the syngas, and a second nitrogen stream used to treat said purge stream, namely the purge or tail gas.

Another aspect of the invention is that the amount of oxygen provided by said oxygen stream to the secondary reformer, is such to have a hydrogen excess in the syngas output from the front-end section, i.e. a HN ratio greater than 3. This will compensate for a lower HN ratio (less than 3) in the recycled stream. In accordance with this aspect of the invention, in a revamping aimed to increase the production of an existing plant, the amount of oxygen fed to the secondary reformer is greater than the theoretical amount corresponding to the desired increase of capacity. A further advantage is that the load of the existing air compressor is reduced.

According to a further aspect of the invention, the purge gas stream is treated in a cryogenic process, where at least part of the purge gas is liquefied obtaining a methane-rich liquid stream and separating a recycle gas stream containing mainly hydrogen and nitrogen. According to specific embodiments, recycle gas stream can be fed at the suction of a circulator of the synthesis loop, or to the main syngas compressor.

In some embodiments of the invention, the purge stream is washed with a pure liquid or mixed liquid/gaseous nitrogen stream. Washing with mixed liquid/gaseous stream may give a more efficient process compared to mixing with gaseous nitrogen only, in particular due to: smaller heat exchange surface, lower temperature of the syngas at the suction of the circulator and/or compression stages and, hence, increase in capacity of the circulator/compressor. Said washing process with liquid or mixed liquid/gaseous nitrogen takes place at a cryogenic temperature, i.e. in a cold box. In further embodiments of the invention, the purge stream is added with a gaseous nitrogen stream before said purge stream enters the cold box.

In a preferred embodiment, a liquid nitrogen stream from the air separation process is used for counter-current washing of the purge stream in a cryogenic device, preferably a cryogenic column. Preferably, the washing of the purge gas takes place with the following process. The purge gas or tail gas is cooled to a cryogenic temperature and the cooled purge gas is then washed in a cryogenic column, with a stream containing liquid nitrogen; a washed purge stream is taken from said column; a gaseous fraction of the washed purge stream is separated to obtain a washed purge gas; said washed purge gas is used to refrigerate the incoming purge gas in a heat exchanger; the washed purge gas is then recycled to the synthesis loop or syngas compressor. The liquid fraction separated from the washed purge stream can be recycled to the cryogenic column.

In another preferred embodiment, the ASU delivers a nitrogen flow in the form of a gaseous pressurized stream. This nitrogen stream is fed to a purge gas recovery unit, where, through a cryogenic process, at least part of the purge gas is liquefied obtaining a liquid stream. Said liquid stream is methane rich and therefore the gaseous stream coming from this purge recovery unit is containing mainly hydrogen and nitrogen and can be recycled back to the synthesis loop or to the relevant compressor. Preferably, the added nitrogen amount is in excess compared to the stoichiometric.

The above embodiments using liquid and gaseous nitrogen, respectively, can be combined. Hence, it is possible to implement also a combined liquid plus gaseous nitrogen solution.

A further alternative is to treat the purge gas in a purge recovery section, which is known in the art, obtaining a tail gas, called also rejected gas, containing some residual hydrogen. According to the invention, said tail gas is treated with the nitrogen to recover said residual hydrogen.

The purge gas prior to be washed/treated with nitrogen is preferably free of ammonia. Ammonia can be removed, for instance, by washing the purge gas counter currently with water. The water is then removed for example using dryers.

The oxygen stream is preferably compressed in a suitable separator and mixed with the air feed of the secondary reforming, thus providing an oxygen-enriched air feed to the secondary reforming.

A further aspect of the invention is a plant adapted to carry out the above process and its various embodiments. An ammonia plant according to the invention comprises: a synthesis loop and a front-end for providing a make-up syngas to said synthesis loop, said front end comprising a primary reformer, a secondary reformer, and further equipments for shift, $CO_2$ removal and methanation; a main syngas compressor for feeding said make-up syngas to the synthesis loop; at least one air separation unit providing an oxygen stream and at least one nitrogen stream; a flow line feeding said oxygen stream to the secondary reformer or to an air compressor feeding said secondary reformer, and is characterized by comprising means adapted to wash a purge gas containing inerts purged from said synthesis loop, or a tail gas coming from a purge gas recovery section, with said at least one nitrogen stream, to obtain a hydrogen-containing, substantially inert-free recycle stream, and a flow line disposed to recycle said stream to the synthesis loop.

According to the above disclosed embodiments, the air separation unit (ASU) may provide nitrogen in liquid or gaseous form, or both. The plant may comprise a cryogenic device, preferably a cryogenic column, where the purge gas is washed in counter-current with a liquid nitrogen stream produced in the ASU, to recover a hydrogen-containing, inert-free gas. In further embodiments, the plant may comprise a purge gas recovery unit where the purge gas is liquefied, and a gaseous nitrogen produced in the ASU is fed to said unit, to recover a gaseous stream containing hydrogen and nitrogen.

The invention is also suitable to revamping of an existing ammonia plant. A further aspect of the invention is then a process for increasing the production of an ammonia plant, comprising an ammonia synthesis loop and a front-end for providing a syngas stream comprising hydrogen and nitrogen to said synthesis loop, the front-end comprising a primary reformer, a secondary reformer, and further equipments for shift, $CO_2$ removal and methanation, and a syngas compressor for feeding said syngas stream to the synthesis loop. The revamping process comprises the steps of: provision of an air separation unit adapted to provide an oxygen stream and at least one liquid or gaseous nitrogen stream; provision of means feeding said oxygen stream to the secondary reformer, or to the air compressor feeding the secondary reformer; the provision of means adapted to use said nitrogen stream for washing a purge gas taken from the synthesis loop, or a tail gas released from treatment of a purge gas, obtaining a hydrogen-containing, substantially inert-free recycle stream, and to recycle said stream to the synthesis loop.

When revamping an existing plant, the above disclosed embodiments of the inventive process can be implemented according to the needs and/or to the features of the old ammonia plant. For example, if the plant is already provided with a purge recovery section (e.g. membranes or other system), it is possible to purge more gas from the loop, by treating the additional purge with the nitrogen made available by the ASU.

In a preferred embodiment, the amount of oxygen furnished by the ASU, and fed to the secondary reformer, is greater than the theoretical amount corresponding to the increase of capacity of the overall plant, in order to reduce the load of the existing air compressor.

A basic advantage of the invention is that the nitrogen stream from the ASU is used to make the process more efficient, by recovering the hydrogen of the purge gas, not only to adjust the HN ratio of the syngas feed.

The invention allows to boost the capacity of the plant, reduces the flow rate increase through the whole front-end and related problems, including pressure drops and duty of the $CO_2$-removal and methanation section. The front-end receives only the pure oxygen stream, necessary for boosting the reforming capacity, while the nitrogen stream, which would pass through the front end substantially as inert gas, is appropriately fed only to the purge gas recovery section, where it is required as one of the reagents to produce ammonia, and in order to establish the correct HN ratio of the make-up syngas.

The use of liquid nitrogen to recover the hydrogen contained in the purge gas, instead of injecting or using it directly in the front-end, has the advantage to require significant less investment cost; actually this washing/treating is accomplished on the purge gas that is typically ten times less than the make-up syngas flow rate fed to the synthesis loop. Another advantage is that the nitrogen is used to wash a stream, namely the purge gas or tail gas, containing a higher amount of inerts than the make-up syngas, and therefore the nitrogen washing of the purge is highly efficient.

The oxygen feed to the secondary reformer has further advantages. The load of the air compressor feeding the secondary reformer is reduced, because a portion of the oxygen necessary to the secondary reformer is now supplied by the ASU. This means that the capacity of the plant can be increased for a given size and output of the air compressor, without the need of a larger and more expensive compressor. In the revamping of an existing plant, the invention provides additional capability/operability of the existing air compressor in case of worse environmental conditions, capacity increase, possible use of the spare compressed air in other location of the ammonia plant. Feeding the existing air compressor with an oxygen-enriched air stream allows to obtain a greater reforming capacity with the same flow rate at inlet of the compressor, i.e. without the need to modify the compressor itself.

Feeding additional oxygen to the secondary reformer has also the advantage that the reforming capacity is substantially increased with no modification of the upstream primary reformer. This is a relevant advantage because, as stated above, boosting the primary reformer is generally not possible or expensive.

By separating the basic components of air (oxygen and nitrogen), the invention allows oxygen and nitrogen addition in optimum points of the plant. More oxygen is available where necessary, namely at the input of the secondary reformer, and nitrogen is fed only where necessary, that is to the ammonia synthesis loop.

It should be noted that the flow rate and inlet pressure of the main syngas compressor are substantially unaltered, even if the plant rate is increased. This invention allows also to decrease the load of the existing machines, especially said main syngas compressor and the air compressor, by simply increasing the load of the ASU, providing additional "room" to the said units; moreover the reduced air compressor load allows to reduce the front-end pressure drop due to the nitrogen, previously supplied by the compressor.

The partial pressure of the $CO_2$ in the syngas is increased, thanks to the less concentration of nitrogen. This means that the $CO_2$-removal section can work in a more efficient way and then the invention helps also to solve the problem of boosting the $CO_2$-removal section.

Summarizing, the invention allows efficient and cost-effective boosting of an existing ammonia plant, or to increase the capability and efficiency of a new plant, for a given investment cost, i.e. size of the main items such as the reformers, the air and syngas compressor, the $CO_2$-removal units, etc. . . . In particular, the invention makes a strategic use of both the oxygen and nitrogen made available by the separation of air.

The advantages will be more evident with the following detailed description of a preferred embodiment.

DETAILED DESCRIPTION OF PREFERRED EMBODIMENTS

Figure 1:
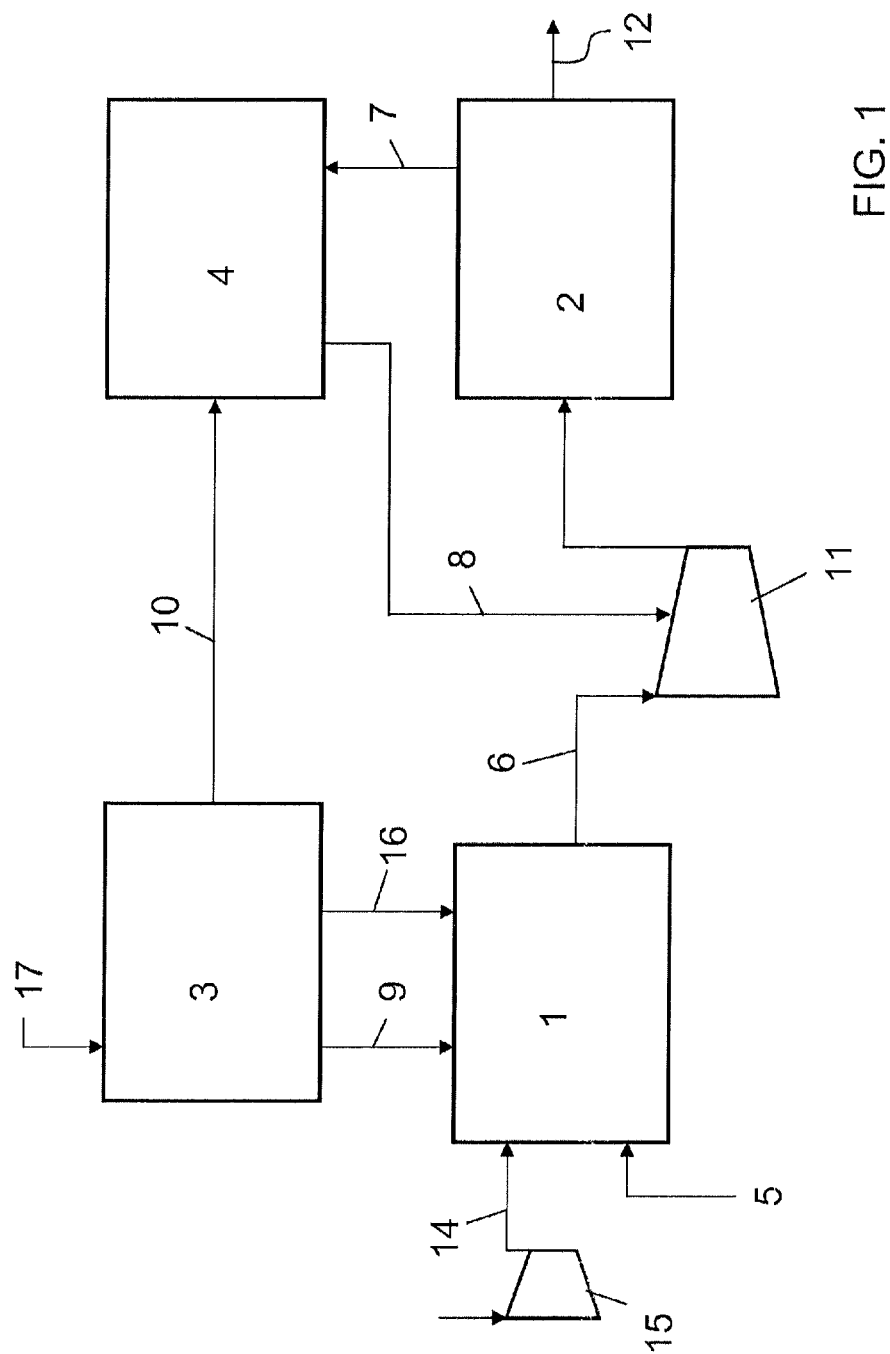
FIG. 1 is a block diagram of an ammonia plant according to the invention, or revamped according to the invention.

Referring to FIG. 1, a conventional ammonia plant comprises basically a front-end reforming section 1 operating at around 25-35 bar; a synthesis loop 2 operating at a greater pressure, e.g. 150 bar; an air separation unit (ASU) 3, and a purge recovery unit 4.

The reforming section 1 is fed with a suitable hydrocarbon source, such as natural gas 5, and by air 14 which is supplied by an air compressor 15. The reforming section 1 delivers a make-up syngas 6 to the loop 2, via a main syngas compressor 11. The front-end 1 and loop 2 are per se known and will not be described further.

The synthesis loop 2 produces ammonia 12 and is exporting a purge gas 7 to the purge recovery unit 4. The purge gas 7 contains hydrogen, nitrogen and a certain amount of inerts, mainly methane and argon. Said purge recovery unit 4 recovers the hydrogen contained in the purge gas 7, providing the loop 2 with a substantially inert-free recycle stream 8 containing hydrogen. Said recycle stream 8 is sent back to the loop 2 for example by feeding to an intermediate stage of the main compressor 11.

The ASU 3 receives an air feed 17 and supplies oxygen 9 to the secondary reformer located in the front-end 1, and liquid and/or gaseous nitrogen 10 to the purge gas unit 4. For example, the purge recovery unit 4 comprises a washing column where the purge gas 7 is washed with liquid nitrogen 10 in order to obtain the recycle stream 8. The ASU 3 delivers optionally a further nitrogen stream 16 which is used to adjust the hydrogen to nitrogen ratio of the syngas 6.

Figure 2:
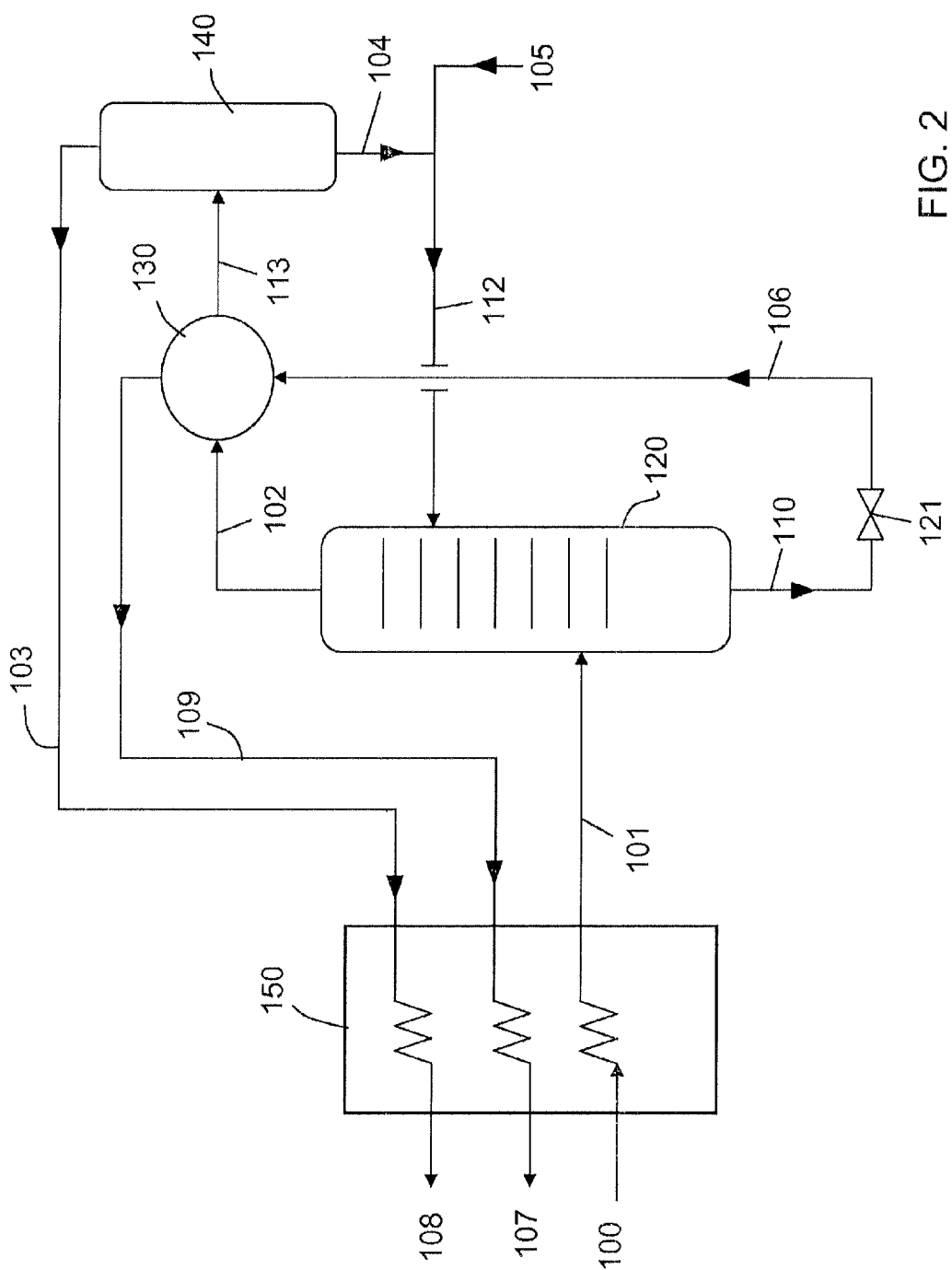
FIG. 2 is a simplified layout of an embodiment of the invention, where a liquid nitrogen is used to wash a purge gas in a column.

A preferred embodiment for cryogenic treatment of the purge gas is disclosed in FIG. 2. A purge gas 100 is taken from the synthesis loop, containing 60-70% hydrogen, around 20% nitrogen and 5-6% of methane and argon. Said gas 100 is cooled in a suitable heat exchanger 150 to a cryogenic temperature, such as −150° C. The cooled purge gas 101 is fed to a cryogenic column 120 where it is washed with liquid nitrogen 105 furnished by the ASU. In the example, the purge gas is washed with a stream 112 containing the liquid nitrogen 105 and a further liquid stream 104 containing mainly nitrogen and hydrogen, recycled from a separator 140.

The methane and partially the argon contained in the gas 101 are removed in the column 120. A substantially methane-free purge gas 102 is delivered at the top of the column 120, while a liquid stream 110, mainly containing nitrogen, condensed methane and argon, is taken at the bottom of the same column 120. The liquid 110 is flashed in a valve 121, obtaining a de-pressurized stream 106.

Said methane-free gas 102 is at least partially condensed in a suitable exchanger 130, by heat exchange with said de-pressurized stream 106. The condensate output 113 of said condenser 130 is treated in the liquid/gas separator 140. Said separator 140 delivers a gaseous stream 103 and the liquid stream 104. The gaseous stream 103 refrigerates the heat exchanger 110 and exits as a re-heated stream 108 for example around −40° C. Said stream 108 is substantially methane-free and contains a smaller amount of Argon (1-2%) than the inlet purge gas 100, then it can be recycled as a reactant (make-up syngas) for the ammonia synthesis loop.

The liquid stream 104 is preferably recycled back to the washing tower 120, e.g. mixed with the liquid nitrogen 105 as in FIG. 2.

The residual methane-rich stream 106 is at least partly evaporated in the exchanger 130 thus forming a gaseous stream 109, which is reheated in the exchanger 150, thus providing a further refrigeration source for the incoming purge gas 100. By re-heating said methane-rich stream 106, a fuel gas 107 is obtained at the outlet of the exchanger 150, which is recycled back to the fuel gas system.

The column 120, heat exchanger 130, separator 140 and heat exchanger 150 are the main items forming a cold box for treatment of the purge gas 100. Auxiliary equipments such as valves, pumps, expander, etc. . . . are not shown.

Figure 3:
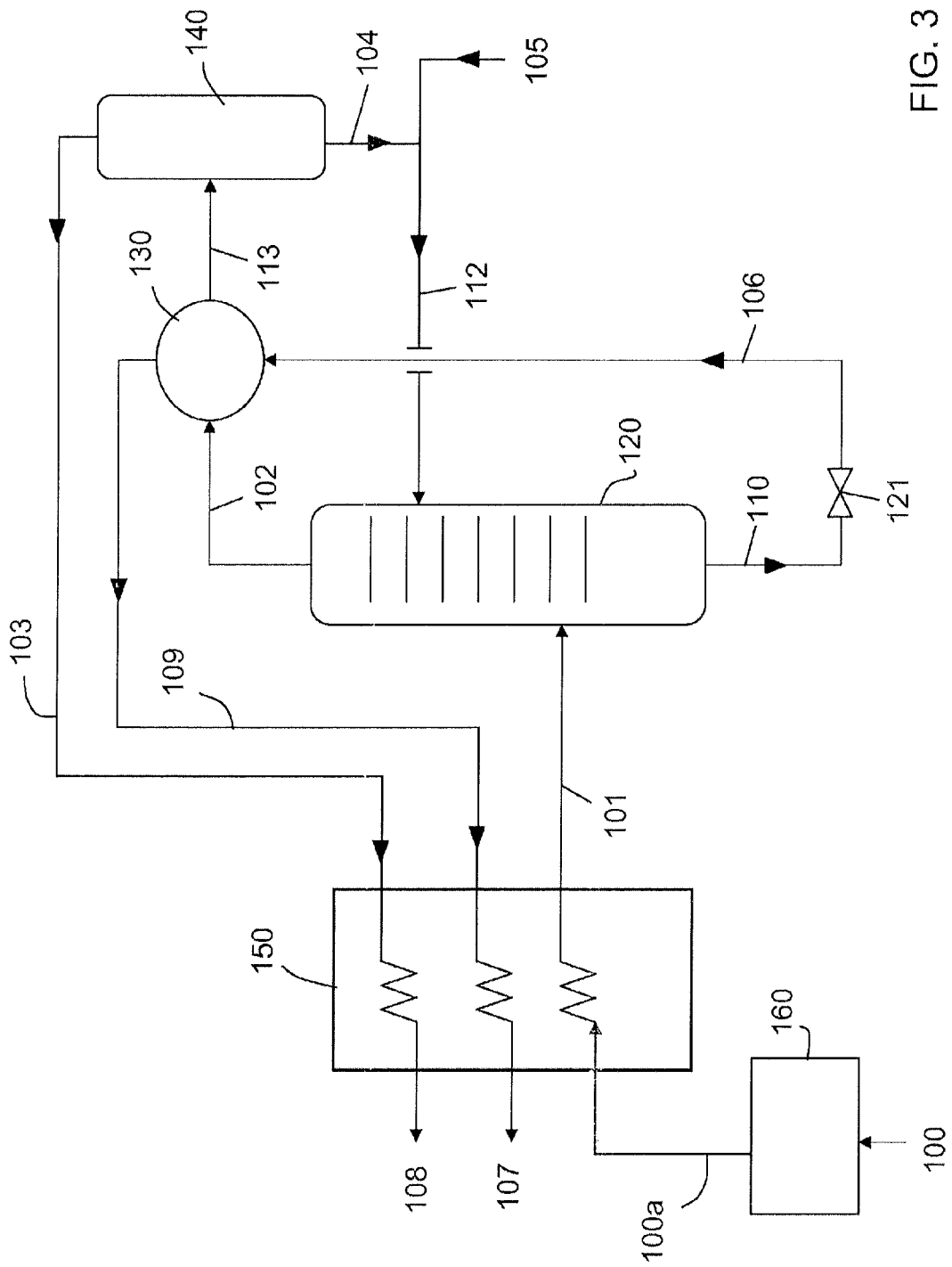
FIG. 3 is a simplified layout of another embodiment of the invention where nitrogen is used to wash a tail gas.

An alternative embodiment is shown in FIG. 3. The purge gas 100 is previously treated in a purge gas recovery unit 160, recovering a portion of the hydrogen contained therein. A tail gas 100a is drawn from said purge gas recovery unit, containing nitrogen, methane, argon, and a residual hydrogen, e.g. around 15%. Said residual hydrogen is further recovered, by treating the tail gas 100a in the same way as described above with reference to FIG. 2.

Figure 4:
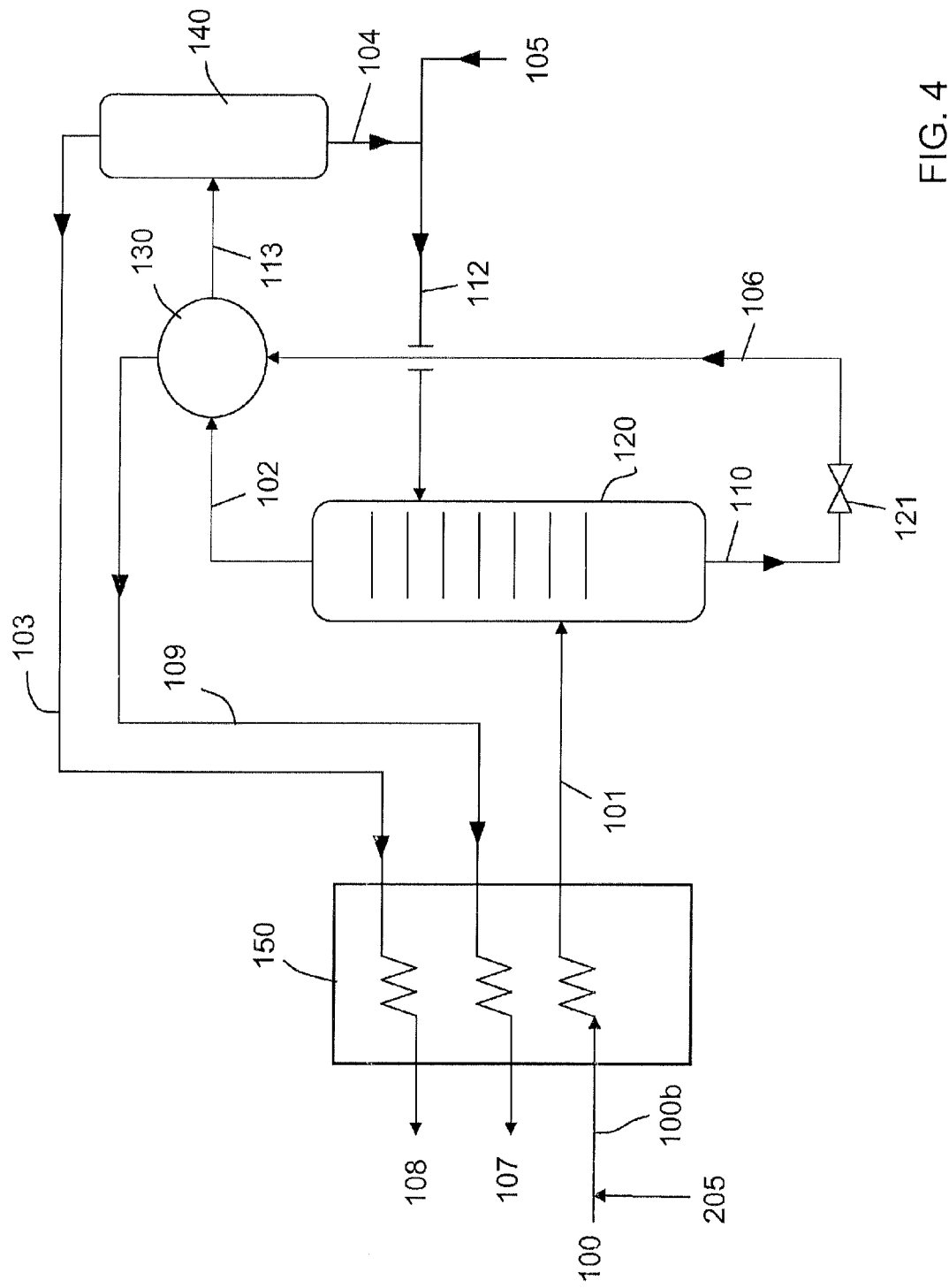
FIG. 4 is a layout of a further embodiment of the invention where gaseous nitrogen is used to treat a purge gas.

The further embodiment of FIG. 4 makes use of a gaseous nitrogen stream. Gaseous nitrogen 205 is mixed with the purge gas 100 before the feeding to the "cold box", i.e. before feeding the gas 100 to the part of the plant at cryogenic temperature. The so obtained nitrogen-enriched purge gas stream 100b is then cooled in the exchanger 150, and fed to the washing column 120, where it is washed with the liquid nitrogen stream 105. Other details of the embodiments of FIGS. 3 and 4 are the same as disclosed with reference to FIG. 2.

EXAMPLE 1

The numerals in the following example relate to FIG. 1. A conventional ammonia plant is revamped by installation of the ASU 3 providing the oxygen stream 9 and the nitrogen stream 10 used to wash the purge gas. The following can be noted: the ammonia output (stream 12) is increased by 14% while air feed 14 to the air compressor decreases by 11%; the total oxygen feed to the secondary reformer however is increased by around 37%, as the air feed 14 contains 21% oxygen while the stream 9 is 95% oxygen. Table 1c discloses detailed composition of streams in FIG. 1 (revamped case).

TABLE 1a (base case)

| | | Stream | | | |
|---|---|---|---|---|---|
| | | 5 | 9 | 14 | 12 |
| Vapour Fraction (mole) | | 1.00 | — | 1.00 | 0.08 |
| Temperature | ° F. | 76.5 | — | 333.5 | 3.0 |
| Pressure | psig | 630.80 | — | 493.10 | 17.26 |
| Molar Flow | lbmole/hr | 4185.0 | — | 5840.0 | 8791.3 |
| Mass Flow | lb/hr | 69206.8 | — | 169153.9 | 149716.3 |

TABLE 1b (revamped)

| | | Stream | | | |
|---|---|---|---|---|---|
| | | 5 | 9 | 14 | 12 |
| Vapour Fraction (mole) | | 1.00 | 1.00 | 1.00 | 0 |
| Temperature | ° F. | 72.8 | 104.0 | 330.4 | 3.0 |
| Pressure | psig | 645.00 | 522.14 | 508.15 | 17.26 |
| Molar Flow | lbmole/hr | 4953.0 | 618.0 | 5200.0 | 10085.1 |
| Mass Flow | lb/hr | 81907.2 | 19947.8 | 150616.5 | 171750.8 |

TABLE 1c

| | | Stream | | | | |
|---|---|---|---|---|---|---|
| | | 5 | 6 | 7 | 8 | 9 |
| Vapour Fraction (mole) | | 1.00 | 1.00 | 1.00 | 1.00 | 1.00 |
| Temperature | °F. | 72.8 | 45.0 | −15.4 | −73.9 | 104.0 |
| Pressure | psig | 645.00 | 355.60 | 1986.67 | 899.00 | 522.14 |
| Molar Flow | lbmole/hr | 4953.0 | 22376.8 | 1440.0 | 1316.4 | 618.0 |
| Mass Flow | lb/hr | 81907.2 | 192860.8 | 14854.0 | 12692.2 | 19947.8 |
| Composition | % mol | | | | | |
| $H_2$ | | — | — | 74.495% | 66.144% | 71.248% | — |
| $N_2$ | | — | 3.403% | 24.557% | 19.474% | 27.489% | 1.000% |
| $NH_3$ | | — | — | — | 1.869% | — | — |
| $CH_4$ | | 95.991% | 0.499% | 6.000% | — | — |
| Ar | | — | 0.373% | 5.522% | 1.263% | 4.000% |
| He | | 0.121% | 0.035% | 0.991% | — | — |
| $H_2O$ | | — | 0.042% | — | — | — |
| $O_2$ | | — | — | — | — | 95.000% |
| $CO_2$ | | 0.118% | — | — | — | — |

| | | Stream | | | |
|---|---|---|---|---|---|
| | | 10 | 12 | 14 | 16 |
| Vapour Fraction (mole) | | 0.00 | 0.06 | 1.00 | 1.00 |
| Temperature | °F. | −240.0 | 3.0 | 330.4 | 122.0 |
| Pressure | psig | 900.00 | 17.26 | 508.15 | 900.00 |
| Molar Flow | lbmole/hr | 198.4 | 10085.1 | 5200.0 | 837.7 |
| Mass Flow | lb/hr | 5558.2 | 171750.8 | 150616.5 | 23472.8 |
| Composition | % mol | | | | |
| $H_2$ | | — | — | — | — |
| $N_2$ | | 99.950% | — | 78.086% | 99.950% |
| $NH_3$ | | — | 99.968% | — | — |
| $CH_4$ | | — | 0.007% | — | — |
| Ar | | 0.050% | — | 0.934% | 0.050% |
| He | | — | — | — | — |
| $H_2O$ | | — | 0.025% | — | — |
| $O_2$ | | — | — | 20.948% | — |

EXAMPLE 2

The following table 2 relates to a plant as in FIG. 2, where purge gas 100 containing around 66% hydrogen and 21.5% nitrogen, plus a 6.4% methane and 5.8% Argon, is treated in a cryogenic section obtaining a methane-free recycle stream 108, containing around 70% hydrogen and 28% nitrogen.

TABLE 2

| | | Stream | | | | |
|---|---|---|---|---|---|---|
| | | 100 | 101 | 102 | 103 | 104 |
| Vapour Fraction (mole) | | 1.00 | 0.95 | 1.00 | 1.00 | 0.00 |
| Temperature | °F. | 14.0 | −239.7 | −266.7 | −277.0 | −277.0 |
| Pressure | psig | 1976.67 | 1975.67 | 900.00 | 900.00 | 900.00 |
| Molar Flow | lbmole/hr | 1384.1 | 1384.1 | 1542.8 | 1278.1 | 264.7 |
| Mass Flow | lb/hr | 14884.8 | 14884.8 | 19336.3 | 12648.4 | 6687.9 |
| Composition | % mol | | | | | |
| $H_2$ | | 66.092% | 66.092% | 60.446% | 70.245% | 13.139% |
| $N_2$ | | 21.586% | 21.586% | 37.589% | 28.541% | 81.272% |
| $CH_4$ | | 6.473% | 6.473% | 0.001% | — | 0.004% |
| Ar | | 5.848% | 5.848% | 1.964% | 1.214% | 5.585% |

| | | Stream | | | |
|---|---|---|---|---|---|
| | | 105 | 106 | 107 | 108 |
| Vapour Fraction (mole) | | 0.00 | 0.26 | 1.00 | 1.00 |
| Temperature | °F. | −240.0 | −294.4 | −22.0 | −44.0 |

TABLE 2-continued

| | | | | | |
|---|---|---|---|---|---|
| Pressure | psig | 900.00 | 29.01 | 28.01 | 899.00 |
| Molar Flow | lbmole/hr | 198.4 | 304.5 | 304.5 | 1278.1 |
| Mass Flow | lb/hr | 5558.2 | 7794.9 | 7794.9 | 12648.4 |
| Composition | % mol | | | | |
| $H_2$ | | — | 5.584% | 5.584% | 70.245% |
| $N_2$ | | 100.000% | 43.504% | 43.504% | 28.541% |
| $CH_4$ | | — | 29.427% | 29.427% | — |
| Ar | | — | 21.485% | 21.485% | 1.214% |

EXAMPLE 3

The following table 3 relates to a plant as in FIG. 3, where tail gas 100a containing around 15% hydrogen and 48% nitrogen, is treated in the cryogenic section. The obtained recycle stream 108 contains around 42% hydrogen and 56% nitrogen.

TABLE 3

| | | Stream | | | | |
|---|---|---|---|---|---|---|
| | | 100a | 101 | 102 | 103 | 104 |
| Vapour Fraction (mole) | | 1.00 | 0.97 | 1.00 | 1.00 | 0.00 |
| Temperature | ° F. | 122.0 | −194.6 | −248.7 | −264.3 | −264.3 |
| Pressure | psig | 901.45 | 900.00 | 435.11 | 435.11 | 435.11 |
| Molar Flow | lbmole/hr | 557.0 | 557.0 | 553.9 | 170.0 | 383.9 |
| Mass Flow | lb/hr | 12585.5 | 12585.5 | 12962.9 | 2915.1 | 10047.8 |
| Composition | % mol | | | | | |
| $H_2$ | | 14.542% | 14.542% | 18.758% | 42.334% | 8.319% |
| $N_2$ | | 48.474% | 48.474% | 79.002% | 56.492% | 88.970% |
| $CH_4$ | | 25.314% | 25.314% | 0.009% | 0.002% | 0.012% |
| Ar | | 11.670% | 11.670% | 2.231% | 1.172% | 2.699% |

| | | Stream | | | |
|---|---|---|---|---|---|
| | | 105 | 106 | 107 | 108 |
| Vapour Fraction (mole) | | 0.00 | 0.43 | 1.00 | 1.00 |
| Temperature | ° F. | −234.4 | −288.5 | 96.7 | 50.0 |
| Pressure | psig | 454.33 | 26.11 | 23.21 | 433.66 |
| Molar Flow | lbmole/hr | 44.1 | 431.1 | 431.1 | 170.0 |
| Mass Flow | lb/hr | 1235.1 | 10906.9 | 10906.9 | 2915.1 |
| Composition | % mol | | | | |
| $H_2$ | | — | 2.096% | 2.096% | 42.334% |
| $N_2$ | | 100.000% | 50.582% | 50.582% | 56.492% |
| $CH_4$ | | 0.000% | 32.704% | 32.704% | 0.002% |
| Ar | | 0.000% | 14.618% | 14.618% | 1.172% |

In the above tables, pressure is given in pounds-force per square inch, relative to atmosphere (psig). Conversion in SI units can be made with the relation 1 psi=6894.76 Pa. The mass flow is given in lb/hr (pounds per hour) where 1 lb=0.4536 kg.

The invention claimed is:

1. A process for producing ammonia, comprising the steps of:
   producing a make-up syngas by steam reforming of a hydrocarbon source, the steam reforming comprising steps of primary reforming and secondary reforming, and further treatment steps of shift, $CO_2$ removal and methanation directly feeding all the produced make-up syngas from the methanation to a syngas compressor;
   compressing and reacting the make-up syngas in a high-pressure synthesis loop to produce ammonia;
   subjecting an air feed to a separation process into an oxygen stream and at least one nitrogen stream, wherein said oxygen stream provides additional oxidizer to said secondary reforming; and
   contacting a purge gas stream, which is a purge gas purged from said synthesis loop or a tail gas coming from a purge gas recovery section, and which contains inerts, with a nitrogen stream obtained from said air separation process, said nitrogen stream coming directly from said air separation process said nitrogen stream being in a liquid state, or a mixture of liquid and gaseous nitrogen, obtaining a substantially inert-free recycle gas containing hydrogen and nitrogen stream, and said recycle gas stream is recycled to the synthesis loop,
   wherein said purge gas stream is contacted with said nitrogen stream at a cryogenic temperature, and wherein upon contacting with the nitrogen stream, at least a part of said purge gas is liquefied producing a methane-rich liquid stream and separating a recycle gas stream containing mainly hydrogen and nitrogen.

2. The process according to claim 1, wherein said purge gas stream is washed with a liquid nitrogen stream or with a mixed gaseous/liquid nitrogen stream by means of a counter-current washing process in a cryogenic device.

3. The process according to claim 2, wherein:
a purge gas or tail gas is cooled to a cryogenic temperature in a heat exchanger obtaining a cooled purge gas;
said cooled purge gas is then washed in a cryogenic column with a stream containing liquid nitrogen;
a washed purge stream is taken from said column;
a gaseous fraction of the washed purge stream is separated to obtain a washed purge gas;
said washed purge gas is used to refrigerate said heat exchanger, exchanging heat with the incoming purge gas;
the washed purge gas is then recycled to the synthesis loop.

4. The process according to claim 3, where said purge gas or tail gas is mixed with gaseous nitrogen before it is cooled to cryogenic temperature in said heat exchanger.

5. The process according to claim 1, wherein a nitrogen stream in the form of a gaseous pressurized stream is fed to a purge gas recovery unit, where, through a cryogenic process, at least part of the purge gas is liquefied obtaining a methane-rich liquid stream;
a gaseous stream coming from this purge recovery unit contains mainly hydrogen and nitrogen and is recycled back to the synthesis loop or to said syngas compressor.

* * * * *